United States Patent [19]

Larsen

[11] 4,438,538
[45] Mar. 27, 1984

[54] COMBINATION TOOL FOR CARPENTRY

[76] Inventor: Peter Larsen, 2186 Montgomery, Cardif by the Sea, Calif. 92007

[21] Appl. No.: 296,338

[22] Filed: Aug. 26, 1981

[51] Int. Cl.³ .......................... B25F 1/00; G01B 19/00
[52] U.S. Cl. ............................................ 7/164; 33/479; 33/451; 33/414; 33/138; 33/332
[58] Field of Search ........................... 7/164, 167, 170; 33/414, 334, 332, 138, 479–481, 429, 451, 474; 145/46

[56] References Cited

U.S. PATENT DOCUMENTS

| | | | |
|---|---|---|---|
| 101,773 | 4/1870 | Sharp | 7/164 |
| 862,139 | 8/1907 | Darrow | 33/138 |
| 2,900,729 | 8/1959 | Basile | 33/451 |
| 3,214,836 | 11/1965 | West | 33/138 |
| 3,336,678 | 8/1967 | Chamberlain | 33/138 |
| 3,568,322 | 3/1971 | Showers | 33/332 |
| 4,189,844 | 2/1980 | Riggins | 33/414 |

FOREIGN PATENT DOCUMENTS

| | | | |
|---|---|---|---|
| 92911 | 7/1897 | Fed. Rep. of Germany | 33/479 |
| 1159868 | 12/1963 | Fed. Rep. of Germany | 145/46 |

*Primary Examiner*—Roscoe V. Parker
*Attorney, Agent, or Firm*—Brown & Martin

[57] ABSTRACT

The tool incorporates a housing for opposed tape and chalkline reels. The housing has sufficient height to act as, and in conjunction with, an attached abutment, to make the tool useable as a cutting guide square. The abutment surface has the triple function of aligning the device square to the edge of a piece of lumber edge while providing mounting bosses for a scribe element, and, with the scribe element, acting as a hanger for removably attaching the device to the user's belt.

14 Claims, 7 Drawing Figures

COMBINATION TOOL FOR CARPENTRY

BACKGROUND OF THE INVENTION

Various tools for use in carpentry have been provided. Frequently, these tools have combined several functions, such as that of a ruler, square, tape measure, and marking scribe. However, no prior art device provides in a single housing, the functions of marking, measuring, cutting guide, and square.

The fact that these multiple functions are not available in a single device, results in the typical framing carpenter having to carry on his person, numerous individual tools to accomplish all the necessary functions. Since certain of these functions are essential, particularly those provided by the ruler, level, and marking scribe instrument (scribe or pencil), then the useful functions of the cutting guide, pitch finder-miter gauge, memo pad, a level, and other useful tools are lost. For example, the benefits of a cutting guide are widely recognized by carpenters. Typically, a cutting guide will be a device with a rectangular planform and provision for squaring the device against a surface to be cut, while at the same time having a sufficient height to guide against the edge of a powersaw for making rapid, accurate cuts across two-by-fours and similar lumber pieces. However, these cutting guides are not widely utilized in the field because they must be carried separately and independently from a tape measure, miter gauge, chalkline, and marking instrument.

Various combined tools have been proposed to alleviate the problems of carrying multiple separate tools. However, combined tools, according to the prior art, have failed to solve the structural problems of combining all of the tools in a single housing which still incorporates all of the functions and results in a device which is easy to carry, mount, and dismount from carrying brackets, and which functions in a manner substantially the equal of each of the individual tools separately.

It is therefore, desirable to have a combination tool which combines many of the functions heretofore available only individually, in separate tools, in a housing, which itself forms a part of the tool and thereby, accomplishes the combination of the prior art individual tools into a single manageable device. Such a device is particularly desirable where standard component parts are utilized so that replacement may be easily accomplished as required.

SUMMARY OF THE INVENTION

In an exemplary embodiment of the invention, the disadvantages of prior art devices are overcome in a single device mounting all of the essential tools from the group comprising pitch finder, miter gauge, level, tape line, ruler, cutting guide, square, marking scribe, and mounting/carrying bracket.

According to the invention, the device incorporates a unitary housing within which the primary components of ruler and chalkline are received and from which the tape and chalkline may be extended and retracted. The housing has a generally elongated rectangular planform and orthogonally-related, straight-edged, sides. Thus, the sides of the housing itself form a rectangular outline for drawing square-relationship lines such as required for cutting notches in rafters. The height of the housing is in excess of one inch but no greater than two inches so that the straight-edged sides of the housing can form the edges of a cutting guide, for guiding a powersaw in making straight cuts across two-by-fours and similar lumber pieces.

Adjacent one end of the long side of the housing, there is located an abutment means, which protrudes from the face of the housing and forms an abutment surface, right angularly related to the surface of the face. This right angular related surface can be engaged with the edge of lumber or other materials as an aide in making both rectangular related cuts and, in conjunction with a miter gauge, in making regulated angular cuts. The abutment surface performs additional functions as well. Located within the supporting bosses carrying the abutment surface, there is a marking scribe which protrudes to and terminates immediately adjacent a side of said housing, but is spaced laterally from the housing, so that the scribe does not normally engage the work surface, but upon the housing being tilted slightly to one side, the scribe element can be caused to engage the work surface, and then by drawing the housing in the desired direction, the scribe will mark the material for locating a cut. A still further function of the abutment means and scribe are that combined, the abutment means and scribe form a hook mounting means spaced from the face of the housing which can be received over a projection on a belt mounted surface so that the tool can be easily supported from and removed from the user's belt.

The invention, therefore, has the advantage that a sufficient number of the essential functions of individual tools are combined in a single device that it becomes desirable and useful for the workman to carry the tool for those essential functions, and then because the tool incorporates many further functions, those additional functions are available, whereas they would otherwise be unavailable or inconvenient. It is a still further advantage of the invention that these functions are combined in a single housing which itself, performs several of the functions thus far performed by separate and individual tools.

Other objects and many attendant advantages of the invention will become more apparent upon reading of the following detailed description together with the drawings in which like reference numerals refer to like parts throughout and in which:

DETAILED DESCRIPTION OF THE DRAWINGS

Figure 1:
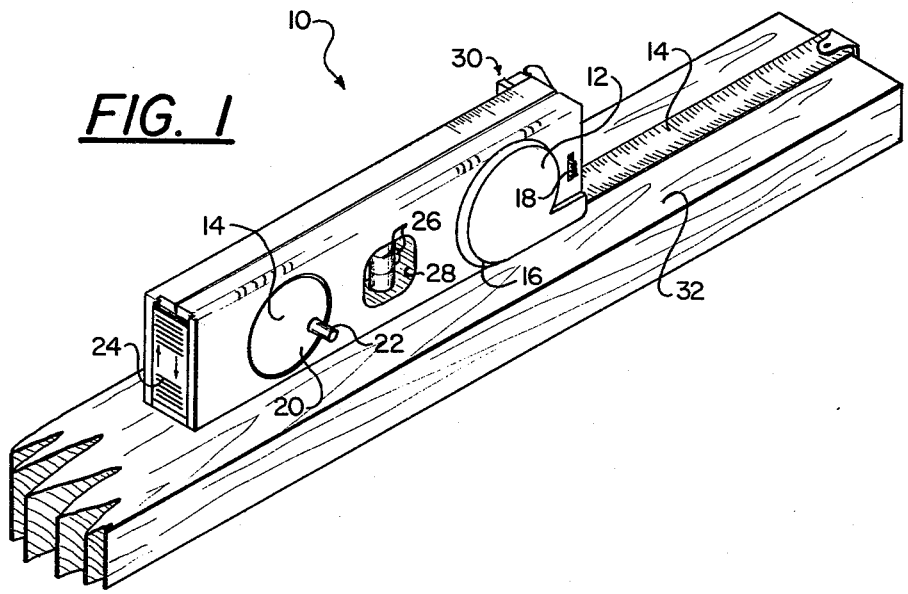
FIG. 1 is a perspective view of the combination tool.

Referring now to the drawings, there is illustrated, a housing 10, in which the primary tool components 12 and 14 are enclosed. The tape measure 12 includes provision for the flexible extensible tape 14 to be retracted and withdrawn into the generally cylindrical housing 16. The operation of the tape is controlled by the locking member 18 in a manner to be described in greater detail hereinafter. Similarly, the chalkline may be extended from and retracted into the housing 10 by the operation of the reel member 20, utilizing handle 22. The end of the chalkline is received and protected in a separate compartment from the chalk and chalkline compartment which is closed by the door 24. Also, apparent in FIG. 1, are the conventional crossed levels 26 which are received through the transverse opening 28 in housing 10.

When utilized as a tape measure the abutment member 30 is on a face of the device not contacting the work surface 32. The operation of the abutment member in this circumstance, will be illustrated in great detail hereinafter.

Figure 2:
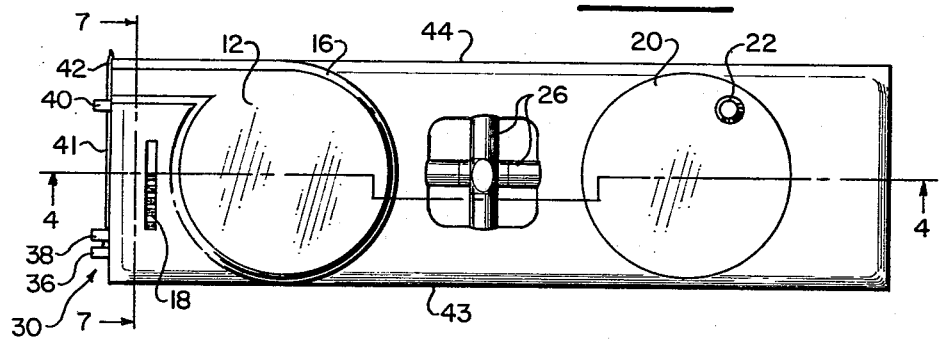
FIG. 2 is a top plan view of the tool.

Referring to FIG. 2, the abutment member 30 is shown to comprise a pair of mounting bosses 36 and 38 which cooperate to hold the head of a common nail 41 and a third boss 40 which further supports the nail adjacent its free end. Free end 42 terminates immediately adjacent but does not extend beyond the side 44.

Figure 3:
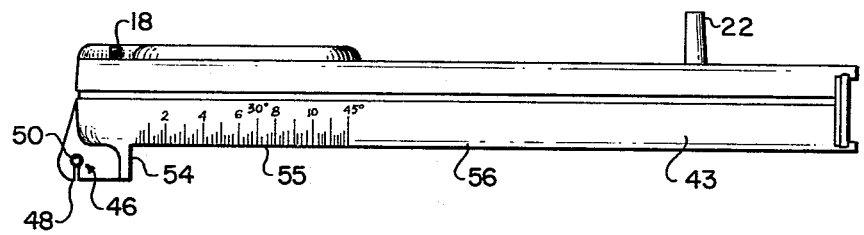
FIG. 3 is a side elevation view of the tool.

FIG. 3 illustrates the detail of the mounting mechanism utilized for the scribe 41. The scribe is received in a keyhole slot 46, the narrow entrance opening 48 has a width slightly smaller than the diameter of the scribe 41. Thus, when the scribe is pressed with sufficient force to cause the boss member to deform, then the scribe will be received in and mechanically held within the opening 50. In this manner, a common nail can be utilized and easily replaced when damaged or worn. The markings 55 can be utilized to create an angle in association with a rocking movement whereby one end of the abutment 54 contacts a working surface of lumber and similar numbers on the other side (not illustrated) accomplish the same for rocking motions in the opposite direction.

The rectangularly related abutment surface 54 of the abuttment means works in opposition to the planar surface 56 of the housing 10, and the right angularly related sides 44 and 43 (as seen in FIG. 2) to produce a square which at the same time, functions as a cutting guide. It will be noted that the edge 44 and 43 of the housing has sufficient height to coact with the base plate of an electrical saw or other cutting tool and to guide the saw without the risk of the saw jumping the guiding edge and injuring the operator or destroying the work piece.

Figure 5:
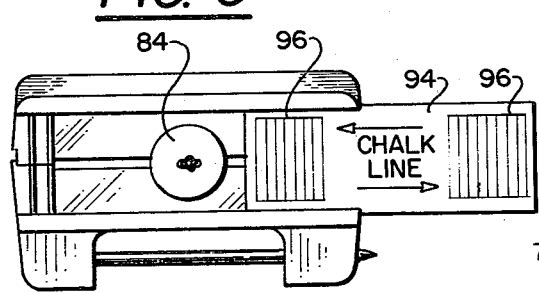
FIG. 5 is an end view showing the chalk compartment door to one side.
Figure 6:
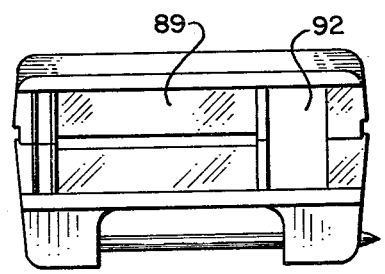
FIG. 6 is an end view, like that in FIG. 5, but showing the chalk door removed.
Figure 4:
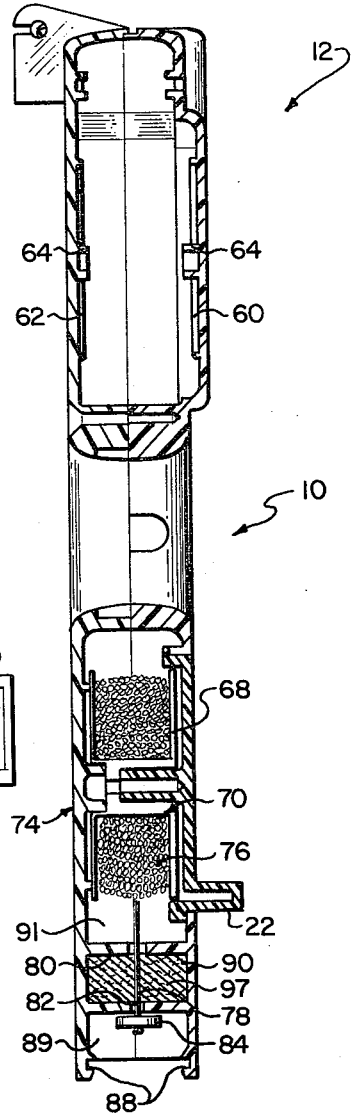
FIG. 4 is a sectional view, taken on line 4—4 of FIG. 2.

Referring to FIGS. 4, 5, and 6, the details of the provision for chalkline and measuring tape are illustrated. The measuring tape 12 incorporates a conventional tape cartridge with integral provisions for winding and unwinding the tape. A pair of facing cylindrical recesses 60 and 62, together with hubs 64 and 66, are provided for mounting the tape cartridge. At the opposite end of the housing 10, a similar provision is made for the chalkline. The chalkline comprises a reel cartridge 68 which is driven by a drum-handle combination 70 and 22 to operate against and rotate around a hub 74. The line 76 is coiled on the drum 70 and the end 78 of the line 76 protrudes through two aligned slots 80 and 82 to be retained outside of the housing by a stop member 84. The outer most portion of the housing 10 forms a compartment 89 for retaining the stop member 84 for use as required. A pair of facing grooves 88 provide for a mounting sliding door 94. The inner compartment 90 is a housing for felt pads 97. Referring to FIGS. 4, 5 and 6, compartment 89 includes a fill opening 92 through which loose chalk is poured to refill the device as required. The opening 92 communicates with the line compartment 91, so that the line becomes impregnated with chalk. When the line 78 is withdrawn from the compartment 91, it passes between the felt pads 97 which wipe the excess chalk from the line and prevent leakage of chalk. The grooves 88 illustrated in FIG. 4, utilized to guide a door and chalkline closure 94, which may be pressed, through the use of serration 96, to one side, as illustrated, to expose the chalkline and stop member 84, and pressed to the other side to expose the fill opening 92.

Figure 7:
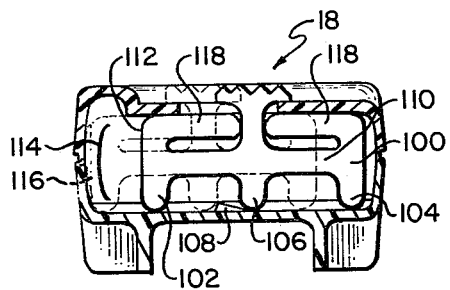
FIG. 7 is a sectional view taken on line 7—7 of FIG. 2.

Referring now to FIG. 7, the details of the locking mechanism operated by handle 18 are illustrated. It will be seen that a unitary stop member 100 is provided, which has a plurality of guiding protrusions, including the end protrusions, 102 and 104 and central protrusion 106. Protrusion 106 operates in relationship to ramp 108 built up within the housing 10. As the operator 18 is reciprocated transversely of housing 10, the protrusion 106 rides up over the long face of ramp 108 causing the central portion 110 of the stop member 100, to articulate and resiliently bend, creating a resilient spring energy which is released when the protrusion passes over the high point of the ramp and down the steep opposite side. At the position of the stop member illustrated in dotted lines, the end 112 of the stop member engages the tape 114 and frictionally holds the tape against the wall of the tape exit channel 116. The frictional force caused by the pressure of the end abutment 112 pressing against the tape 114 and flattening the tape against the wall of channel 116 to the dotted line position illustrated, holds the tape in a frictionally locked, extended, or retracted position. When the operator 18 is reciprocated to the solid line position illustrated, the stop member is resiliently held in that position by the ramp 108 and thereby, is held out of engagement with the tape member 114, leaving the tape member 114 free to be retracted by the spring energy of the coiled tape cartridge, causing the tape to be retracted within the housing. Arms 118 extend away from and then back along the central spring member 110 so that they generally are aligned with the slot in which the operator 18 operates. The arms 118 are substantially adjacent to and yet do not interfere with the operator 18 and therefore, block the opening to the slot against the admission of dirt and other contaminants.

The outer surface of the housing 10 is of a roughened texture so that an ordinary carpenter's pencil will mark on the surface of the device. In this manner, the carpenter is free to make notes while working on the job without carrying a separate note pad. A damp cloth then may be later utilized to remove the markings for later remarking with additional notes.

Although other materials may be utilized, the use of ABS plastic is especially desirable in conjunction with the invention as the plastic has sufficient strength to provide a tool of high durability and low weight.

Having described my invention, I now claim:
1. A carpentry tool comprising:
   a housing of generally elongated rectangular configuration having at least two orthogonally-related, straight-edged sides and at least one substantially planar face;
   fixed abutment means extending from said planar surface adjacent one end thereof, said abutment means defining a plane facing the other end of said housing and being transversely perpendicular to said planar surface and defining a T-square with pivot points at either end thereof coincident with the intersection of the ends of said abutment with the edges of said planar surface;

planar fixed indicia along at least one side of said housing cooperatively arranged with one of said pivot points on the opposite side of said housing to indicate and establish an angle with respect to an external elongated member when said pivot point is an engagement with the sides of the external member; and orthogonally related bubble level elements fixed to said housing;

whereby when one of said pivot points is engaged with the edge of a structural member mounted at an angle with respect to the horizontal and the applicable bubble is centered, the existing angle or pitch of said structural member with respect to horizontal may be determined directly from said indicia.

2. The tool according to claim 1, wherein:
said abutment means further comprises scribe means including a sharp pointed spike for marking work surfaces.

3. The tool according to claim 2, wherein:
said abutment means further comprises hook means for being spaced from said planer surface to be received over a support projection for supporting said housing from the support projection.

4. The tool according to claim 3, wherein:
said abutment means comprises a plurality of spaced bosses having aligned keyhole slots for receiving said scribe element.

5. The tool according to claim 4 and further comprising:
an additional boss closely spaced from one of said plural bosses for receiving therebetween a flange on said scribe element.

6. The tool according to claim 5, wherein:
said scribe element comprises a nail having a diameter slightly greater than the narrowest width of said keyhole slots.

7. The tool according to claim 2, wherein:
the point of said spike of said marking scribe terminates immediately adjacent a side of said housing spaced laterally from said housing, but does not project beyond the plane of said side, said scribe element being substantially longitudinally immovable.

8. The tool according to claim 1, wherein:
said housing comprises a plastic material having a roughened surface texture.

9. A carpentry tool comprising:
a housing of generally elongated rectangular configuration having at least two orthogonally-related, straight-edged sides and at least one substantially planar face;

a flexible, extensible tape measure mounted within said housing in coiled form and having an exit opening in said housing for said tape;

fixed abutment means extending from said planar surface adjacent one end thereof, said abutment means defining a plane facing the other end of said housing and being transversally perpendicular to said planar surface and defining a T-square with pivot points at either end thereof coincident with the intersection of the ends of said abutment with the edges of said planar surface;

planar fixed indicia along at least one side of said housing cooperatively arranged with one of said pivot points on the opposite side of said housing to indicate and establish an angle with respect to an external elongated member when said pivot point is in engagement with the sides of the external member;

a rigid scribe element; and means for releasably receiving said scribe element in said abutment means with said scribe being mounted in parallel relationship with the plane of said abutment on the opposite side of said abutment from said plane and adjacent said tape exit opening, the pointed end of said scribe being closely adjacent to one of said straight edges but within the extended confines of said housing envelope so as to not interfere with the straight edge function of said tool, said receiving means preventing substantial longitudinal movement of said scribe element, said scribe element being spaced outwardly from planar surface of said housing in a parallel fashion to enable it to function to make a mark on a surface by tilting said housing slightly with respect to the surface.

10. The tool recited in claim 9 wherein said scribe element is substantially in alignment with the end of said housing, said tape emerging from said housing adjacent said end thereof, whereby said scribe element is adapted to mark external members to accurately indicate locations measured by means of said tape.

11. The tool recited in claim 9 wherein said abutment is formed of at least two spaced bosses, each said boss being adjacent one side of said housing, said scribe elements spanning the space between said bosses thereby forming a hanger for said tool adapted to engage an external hook element.

12. A carpentry tool comprising:
a housing of generally elongated rectangular configuration having at least two orthogonally-related, straight-edged sides and at least one substantially planar face;

fixed abutment means extending from said planar surface adjacent one end thereof, said abutment means defining a plane facing the other end of said housing and being transversally perpendicular to said planar surface and defining a T-square with pivot points at either end thereof coincident with the intersection of the ends of said abutment with the edges of said planar surface;

planar fixed indicia along at least one side of said housing cooperatively arranged with one of said pivot points on the opposite side of said housing to indicate and establish an angle with respect to an external elongated member when said pivot point is in engagement with the sides of the external member;

a flexible, extensible tape measure mounted within said housing, said tape being normally curved in a lateral direction and being extensible from said housing through an opening therein;

bistable reciprocable means for selectively locking said tape in position with respect to said housing, said locking means comprising:
a cavity adjacent the opening in said housing;
a spring stop member slidably confined within said cavity;
an operator element extending laterally from said stop member through an opening in said housing;
a ramp within said cavity fixed to said housing;

a protrusion on said stop member engaging said ramp to retain said stop member in either the locked or unlocked position;

whereby when said locking means is in the locked position, said normally curved tape is flattened against the side of said cavity, the spring action of said tape biasing it to a curved condition tending to hold said tape in locked position confined between said locking means and the side of said cavity.

13. A carpentry tool comprising:

a housing of generally elongated rectangular configuration having at least two orthogonally-related, straight-edged sides and at least one substantially planar face;

fixed abutment means extending from said planar surface adjacent one end thereof, said abutment means defining a plane facing the other end of said housing and being transversally perpendicular to said planar surface and defining a T-square with pivot points at either end thereof coincident with the intersection of the ends of said abutment with the edges of said planar surface;

planar fixed indicia along at least one side of said housing cooperatively arranged with one of said pivot points on the opposite side of said housing to indicate and establish an angle with respect to an external elongated member when said pivot point is in engagement with the sides of the external member;

a flexible, extensible chalkline coiled within a cavity in said housing, said cavity being spaced from but adjacent one end of said housing, said chalkline being adapted for extension from and retraction within said cavity, said cavity also retaining a supply of chalk in powder form, said chalkline having an enlarged stop member on the end extending from said coil;

a first compartment positioned between said cavity and said end, said compartment being formed by space lateral partitions each having openings therein through which said chalkline passes, said lateral partitions being shorter than the full width of said housing thereby defining a passage communicating between said cavity and said end of said housing;

a second compartment positioned between said first compartment and said end of said housing, said second compartment being defined on one side by one of said lateral partitions;

door means slidingly mounted to said housing to cover and define the end thereof, said door means normally defining the other side of said second compartment and covering the outer end of said passage, said enlarged stop member normally residing within said second compartment and being accessible for extension of said chalkline when said door means is slid in one direction with respect to said end of said housing, said passage being accessible for pouring chalk into said cavity when said door means is slid in the opposite direction, said second compartment being covered when said passage is exposed, said passage being covered when said second compartment is exposed.

14. A carpentry tool comprising:

a housing of generally elongated rectangular configuration having at least two orthogonally-related, straight-edged sides and at least one substantially planar face;

fixed abutments means extending from said planar surface adjacent one end thereof, said abutment means defining a plane facing the other end of said housing and being transversely perpendicular to said planar surface and defining a T-square with pivot points at either end thereof coincident with the intersection of the ends of said abutment with the edges of said planar surface;

planar fixed indicia along at least one side of said housing cooperatively arranged with one of said pivot points on the opposite side of said housing to indicate and establish an angle with respect to an external elongated member when said pivot point is in engagement with the sides of the external member;

a flexible, extensible chalkline coiled within a cavity in said housing, said cavity being spaced from but adjacent one end of said housing, said chalkline being adapted for extension from and retraction within said cavity, said cavity also retaining a supply of chalk in powder form, said chalkline having an enlarged stop member at the end extending from said coil;

a channel in communication between the end of said housing and said cavity;

a compartment positioned between said cavity and said end of said housing, said stop member normally residing in said compartment when said chalkline is fully coiled, said chalkline extending through said compartment when said chalkline is extended beyond the end of said housing, said compartment and said channel being laterally adjacent each other; and a slide closure substantially coextensive with said one end of said housing, said slide closure having a first operative position covering said compartment and said channel, a second operative position when slid in one direction exposing only said channel to permit access to said cavity through said channel for ingress and egress of chalk, and a third position when slid in the opposite direction exposing said compartment to permit access to said enlarged stop member to facilitate extension of said chalkline.

* * * * *

UNITED STATES PATENT AND TRADEMARK OFFICE
CERTIFICATE OF CORRECTION

PATENT NO. : 4,438,538
DATED : March 27, 1984
INVENTOR(S) : Peter Larsen

It is certified that error appears in the above-identified patent and that said Letters Patent are hereby corrected as shown below:

Column 5, line 8, before the word "engagement", change "an" to --in--.

Signed and Sealed this

*Twenty-fifth* Day of *September 1984*

[SEAL]

*Attest:*

*Attesting Officer*

GERALD J. MOSSINGHOFF

*Commissioner of Patents and Trademarks*